United States Patent
Chen

(10) Patent No.: US 12,100,147 B2
(45) Date of Patent: Sep. 24, 2024

(54) METHOD FOR FITTING IMAGE

(71) Applicant: CHANGXIN MEMORY TECHNOLOGIES, INC., Hefei (CN)

(72) Inventor: Yui-Lang Chen, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 407 days.

(21) Appl. No.: 17/698,093

(22) Filed: Mar. 18, 2022

(65) Prior Publication Data

US 2022/0309659 A1  Sep. 29, 2022

(30) Foreign Application Priority Data

Mar. 26, 2021  (CN) .......................... 202110328201.4

(51) Int. Cl.
*G06T 7/00* (2017.01)
*G06T 7/73* (2017.01)
*G06V 10/24* (2022.01)
*G06V 10/26* (2022.01)

(52) U.S. Cl.
CPC .............. *G06T 7/0012* (2013.01); *G06T 7/73* (2017.01); *G06V 10/245* (2022.01); *G06V 10/273* (2022.01); *G06T 2207/30148* (2013.01)

(58) Field of Classification Search
CPC ... G06F 3/005; A61K 39/39; G02F 1/133612; H01L 33/62; G06T 7/0012; G06T 7/73; G06V 10/245; G06V 10/273; B64C 39/024; B64C 1/00; B29C 43/18
See application file for complete search history.

(56) References Cited

U.S. PATENT DOCUMENTS

2003/0007154 A1* 1/2003 Tandon .................... G01J 3/513
356/406
2012/0319222 A1* 12/2012 Ozawa .............. H01L 27/14605
257/E31.127

FOREIGN PATENT DOCUMENTS

CN          112150541 A    12/2020

* cited by examiner

*Primary Examiner* — Phuoc H Doan
(74) *Attorney, Agent, or Firm* — Kilpatrick Townsend & Stockton LLP

(57) ABSTRACT

Embodiments of the disclosure provide an image fitting method. The method includes: providing a chip plate and a plurality of photographing assemblies, where the chip plate is used to place a chip tray, and the photographing assemblies are used to capture images of the chip plate; acquiring a chip plate image captured by each photographing assembly, where the chip plate image is an image of the chip plate with a partial area and the chip tray placed on the chip plate; acquiring a chip tray image included in each chip plate image, where the chip tray image is an image of the chip tray with a partial area; and fitting the plurality of chip tray images to acquire a chip image, where the chip image is an image of an entire chip tray.

15 Claims, 12 Drawing Sheets

METHOD FOR FITTING IMAGE

CROSS-REFERENCE TO RELATED APPLICATION

The present application is based upon and claims priority to Chinese Patent Application No. 202110328201.4, filed on Mar. 26, 2021, the entire content of which is incorporated herein by reference.

TECHNICAL FIELD

The present application relates to the field of semiconductor detection.

BACKGROUND

In a semiconductor manufacturing process, chips in a chip tray are calibrated and identified mainly by acquiring the codes of the chips. However, the acquisition of the codes of the chips requires the use of an expensive laser camera, and the image capturing range of the laser camera is small and the codes of all chips in the chip tray cannot be acquired through a single acquisition.

At present, the codes of chips in the chip tray are mainly acquired by manually controlling the laser camera. However, since there are a large number of chips in the chip tray, the laser camera needs to be controlled to perform photographing multiple times, to acquire the codes of all the chips in the chip tray, which consumes a lot of detection time and is not conducive to batch production of chips. Moreover, manual operation is prone to cause problems such as missing acquisition, repeated acquisition, and wrong position sequence acquisition.

Therefore, how to acquire the codes of all chips in a chip tray in single photographing for the chip tray is an urgent problem to be solved in the semiconductor manufacturing process.

SUMMARY

Embodiments of the disclosure provide an image fitting method to acquire an image of an entire chip tray in a single photographing process.

According to the embodiments of the disclosure, there is provided an image fitting method. The method includes: providing a chip plate and a plurality of photographing assemblies, where the chip plate is used to place a chip tray, and the photographing assemblies are used to capture images of the chip plate; acquiring a chip plate image captured by each photographing assembly, where the chip plate image is an image of the chip plate with a partial area and the chip tray placed on the chip plate; acquiring a chip tray image included in each chip plate image, where the chip tray image is an image of the chip tray with a partial area; and fitting a plurality of chip tray images to acquire a chip image, where the chip image is an image of an entire chip tray.

A plurality of photographing assemblies are configured to photograph the chip tray, and different photographing assemblies are configured to photograph different areas of the chip tray. The plurality of photographing assemblies photograph the different areas of the chip tray at the same time, so that in a single photographing process, the image of the entire chip tray can be acquired, thereby acquiring the codes of all chips in the chip tray, saving the detection time, and facilitating batch production of chips.

DETAILED DESCRIPTION

At present, the codes of chips in the chip tray are mainly acquired by manually controlling the laser camera. However, since there are a large number of chips in the chip tray, the laser camera needs to be controlled to perform photographing multiple times to acquire the codes of all the chips in the chip tray, which consumes a lot of detection time and is not conducive to batch production of chips. Moreover, manual operation is prone to cause problems such as missing acquisition, repeated acquisition, and wrong position sequence acquisition.

In order to solve the foregoing problem, embodiments of the disclosure provide an image fitting method, including: providing a chip plate and a plurality of photographing assemblies, where the chip plate is used to place a chip tray, and the photographing assemblies are used to capture images of the chip plate; acquiring a chip plate image captured by each photographing assembly, where the chip plate image is an image of the chip plate with a partial area and the chip tray placed on the chip plate; acquiring a chip tray image included in each chip plate image, where the chip tray image is an image of the chip tray with a partial area; and fitting a plurality of chip tray images to acquire a chip image, where the chip image is an image of an entire chip tray.

In order to make the objectives, technical solutions and advantages of the embodiments of the disclosure clearer, various embodiments of the disclosure will be described in detail below in combination with the accompanying drawings. However, it can be understood by persons of ordinary skills in the art that, in various embodiments of the disclosure, many technical details have been proposed in order to give the reader a better understanding of the disclosure. However, the technical solutions claimed in the disclosure can be implemented even without these technical details and various changes and modifications based on the following various embodiments. The division of various embodiments below is for the convenience of description, and should not constitute any limit to the specific implementation of the disclosure. The various embodiments may be combined with each other and referred to each other on the premise of not contradicting each other.

Figure 1:
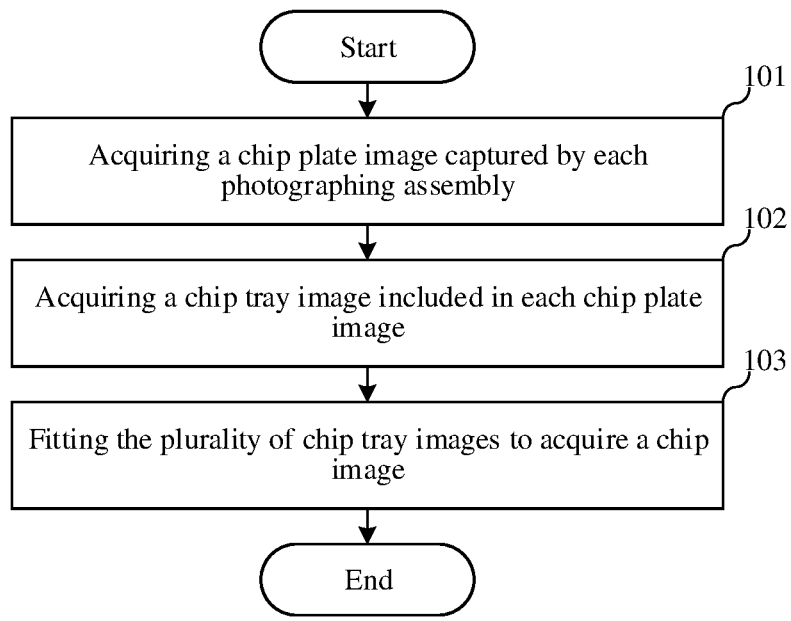
FIG. 1 is a schematic flowchart of an image fitting method provided in the embodiments of the disclosure.
Figure 2:
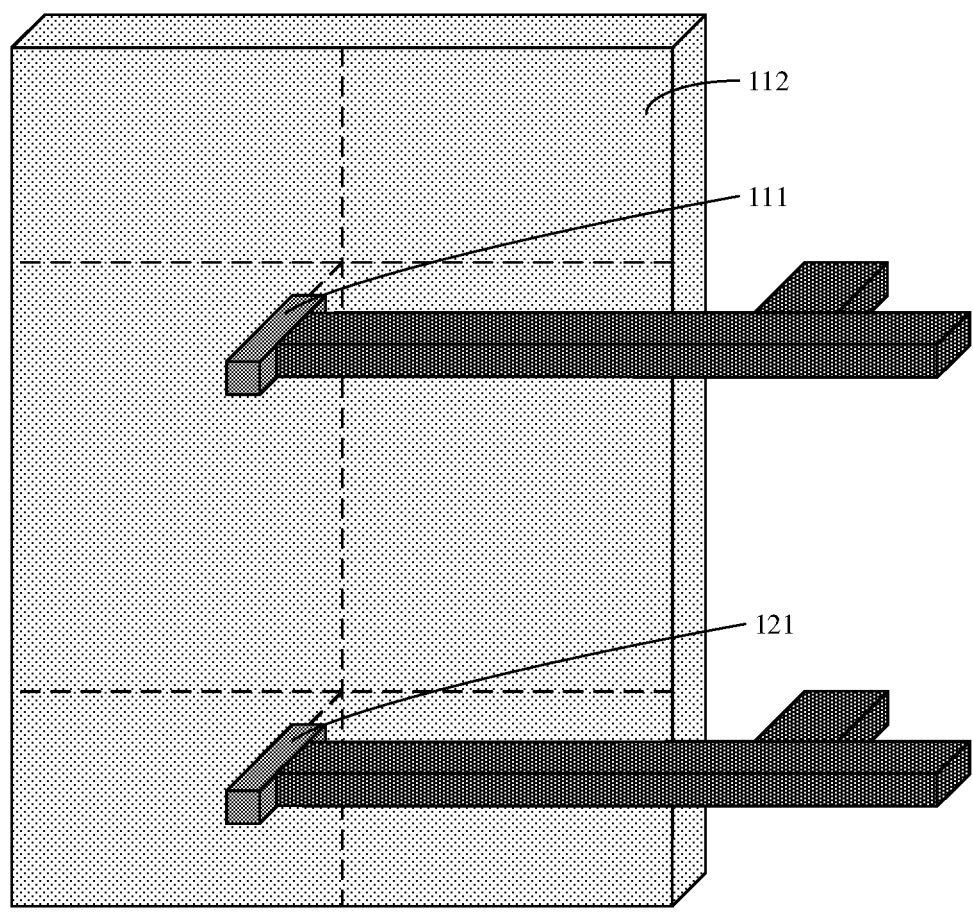
FIG. 2 is a schematic diagram of a structure of a chip plate and photographing assemblies in the image fitting method provided in the embodiments of the disclosure.
Figure 7:
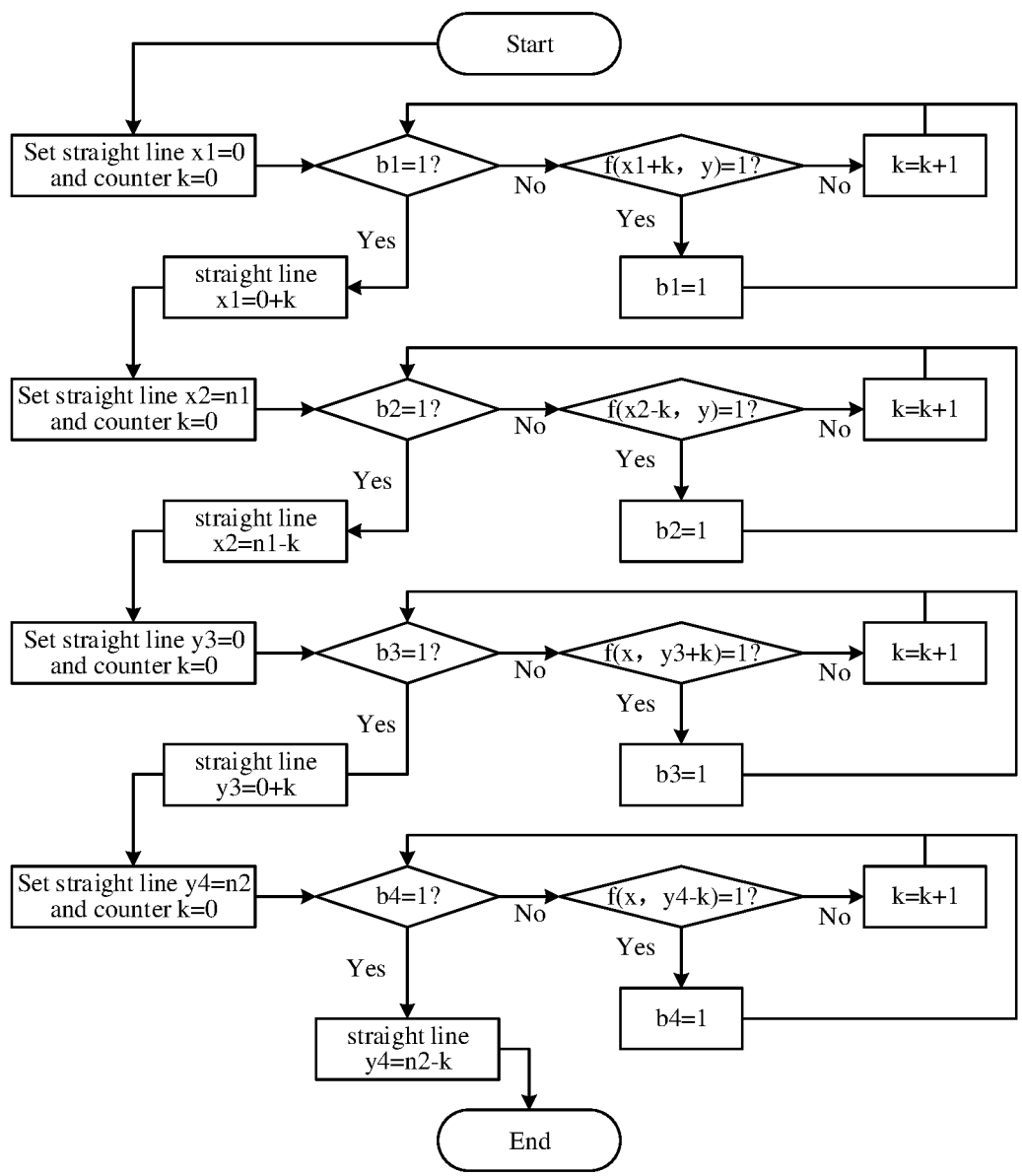
FIG. 7 is a schematic flowchart of acquiring the chip tray image included in each chip plate image provided in the embodiments of the disclosure.
Figure 8:
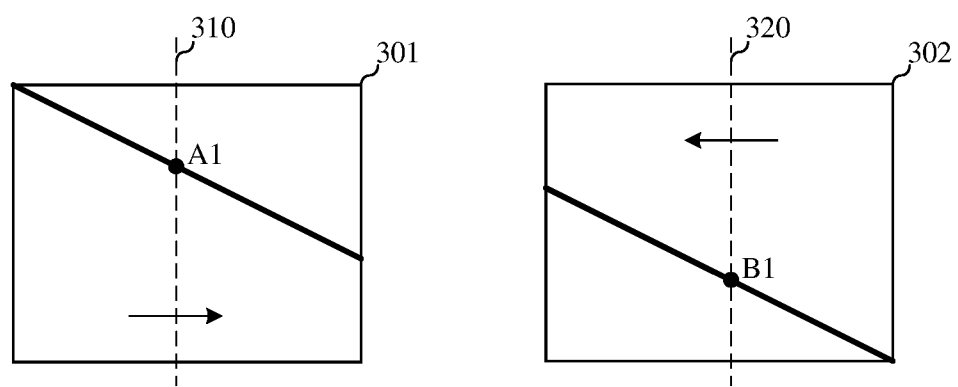
FIG. 8 to FIG. 10 are schematic diagrams corresponding to respective steps in fitting a plurality of chip tray images to acquire a chip image in the image fitting method provided in the embodiments of the disclosure.
Figure 9:
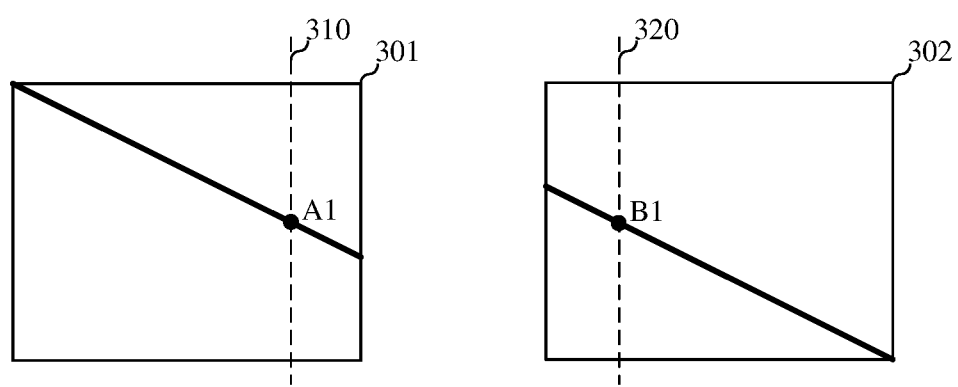
Figure 10:
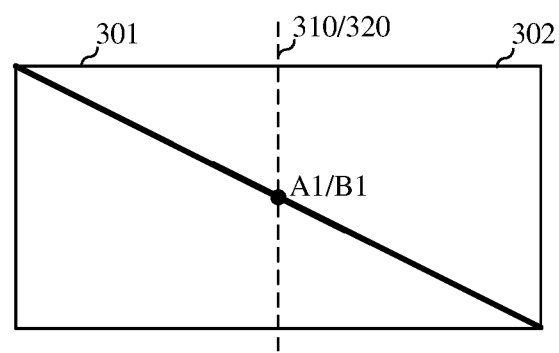
Figure 11:
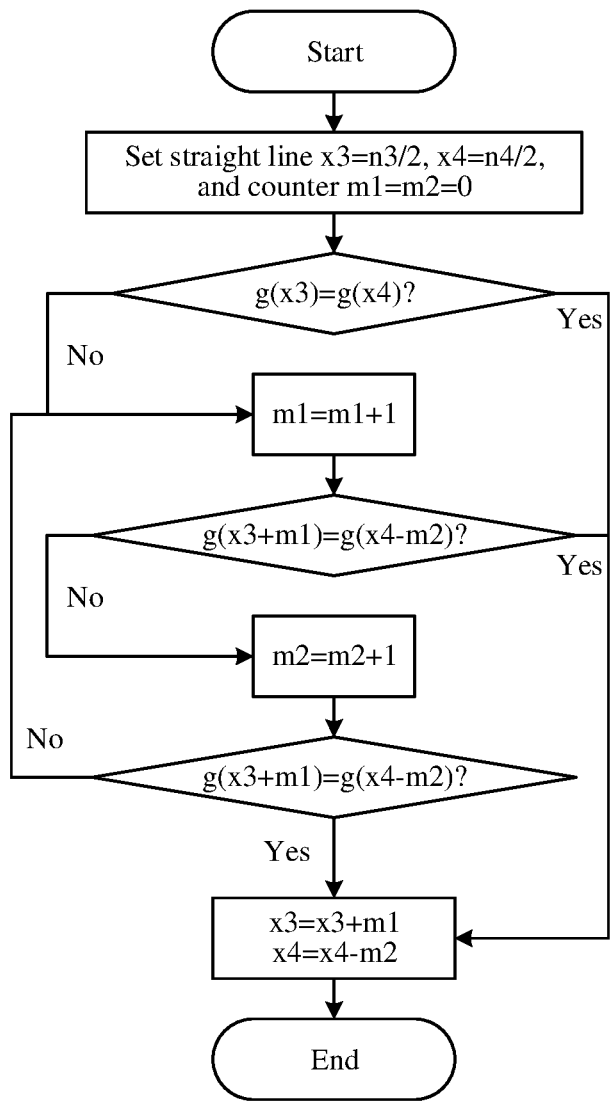
FIG. 11 and FIG. 12 are schematic flowcharts of fitting the plurality of chip tray images to acquire the chip image provided in the embodiments of the disclosure.
Figure 12:
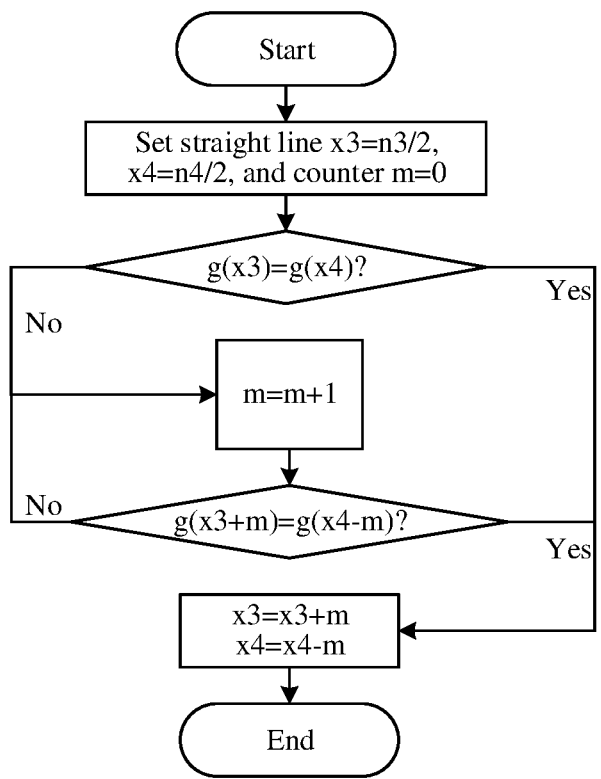

FIG. 1 is a schematic flowchart of an image fitting method provided in the embodiment. FIG. 2 is a schematic diagram of a structure of a chip plate and photographing assemblies in the image fitting method provided in the embodiment. FIG. 3 to FIG. 6 are schematic diagrams corresponding to respective steps in acquiring a chip tray image included in each chip plate image in the image fitting method provided in the embodiment. FIG. 7 is a schematic flowchart of acquiring the chip tray image included in each chip plate image provided in the embodiment. FIG. 8 to FIG. 10 are schematic diagrams corresponding to respective steps in fitting a plurality of chip tray images to acquire a chip image in the image fitting method provided in the embodiment. FIG. 11 and FIG. 12 are schematic flowcharts of fitting the plurality of chip tray images to acquire the chip image provided in the embodiment. The pulse generating circuit provided in the embodiment will be further described in detail below with reference to the accompanying drawings.

Referring to FIG. 2, a chip plate 112 and a plurality of photographing assemblies are provided. The chip plate 112 is used to place a chip tray (not illustrated), and the photographing assemblies are used to capture images of the chip plate 112.

Referring to FIG. 1, the image fitting method includes the following operations.

At block 101, a chip plate image captured by each photographing assembly is acquired.

Specifically, the chip plate image captured by each photographing assembly is acquired. The chip plate image is an image of the chip plate 112 with a partial area (referring to FIG. 2) and the chip tray (not illustrated) placed on the chip plate 112 (referring to FIG. 2).

In an example, referring to FIG. 2, a first photographing assembly 111 is configured to capture a first chip plate image for a first area of the chip plate 112, and a second photographing assembly 121 is configured to capture a second chip plate image for a second area of the chip plate 112. The sum of the first chip plate image and the second chip plate image at least covers an image of an entire chip plate.

It should be noted that the use of two photographing assemblies in the embodiment is for specifically explaining the image fitting method provided in the disclosure, and does not constitute any limit to the embodiment. In other embodiments, the plurality of photographing assemblies may refer to 3, 5 or 7 photographing assemblies. In addition, the first photographing assembly 111 and the second photographing assembly 121 each include at least one camera. The specific number of cameras may be determined according to the desired image accuracy in practical application. The embodiment does not constitute any limit to the specific number of cameras in the first photographing assembly 111 and the second photographing assembly 121.

At block 102, a chip tray image included in each chip plate image is acquired.

Specifically, the chip tray image included in each chip plate image is acquired, and the chip tray image is an image of the chip tray with the partial area.

In the embodiment, the chip tray image included in the chip plate image is acquired based on an image difference between a position corresponding to the chip tray and a position corresponding to the chip plate in the chip plate image. The image difference includes at least one of a color difference, a gray scale difference or a brightness difference. The chip tray image is simply and quickly acquired from the chip plate image through the image difference between the chip tray position and the chip plate position. It should be noted that the use of the color difference as the image difference in the embodiment to acquire the chip tray image from the chip plate image is merely an example for the image difference. In other embodiments, the gray scale difference, the brightness difference or the like may be used as the image difference to acquire the chip tray image from the chip plate image.

In one example, referring to FIG. 2, the first chip plate image captured by the first photographing assembly 111 and the second chip plate image captured by the second photographing assembly 121 are acquired; and a first chip tray image is acquired based on the first chip plate image, and a second chip tray image is acquired based on the second chip plate image. The sum of the first chip tray image and the second chip tray image covers an image of the entire chip tray. That is, the first chip tray image is acquired from the first chip plate image according to an image difference between a position corresponding to the chip tray and a position corresponding to the chip plate in the first chip plate image, and the second chip tray image is acquired from the second chip plate image according to an image difference between a position corresponding to the chip tray and a position corresponding to the chip plate in the second chip plate image.

The operation of acquiring the chip tray image form the chip plate image may be automatic through the method below, specifically including the following steps.

Figure 3:
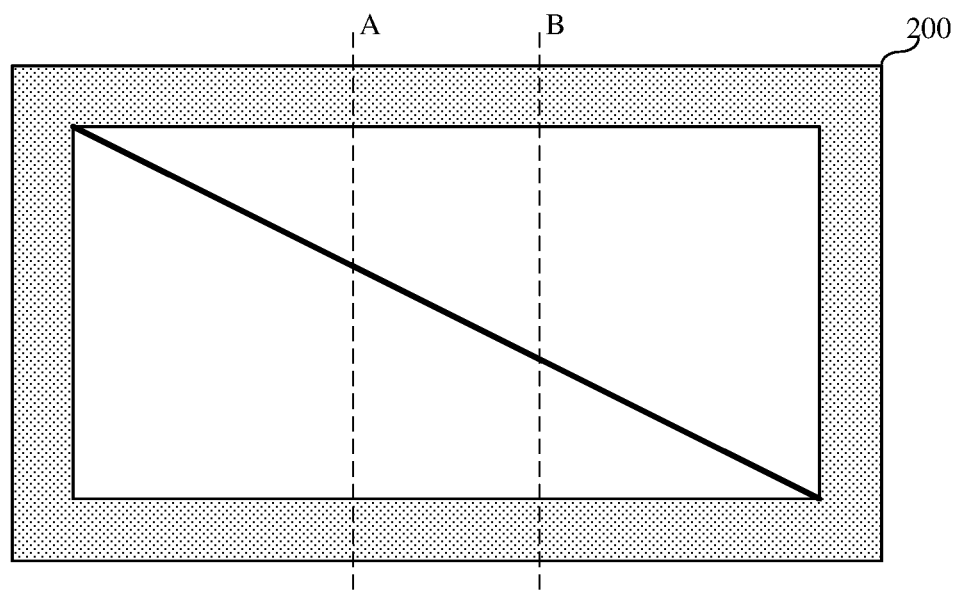
FIG. 3 to FIG. 6 are schematic diagrams corresponding to respective steps in acquiring a chip tray image included in each chip plate image in the image fitting method provided in the embodiments of the disclosure.

In step 1021, paper is placed on the chip plate, where the paper and the chip plate have the image difference, referring to an image 200 in FIG. 3.

Figure 4:
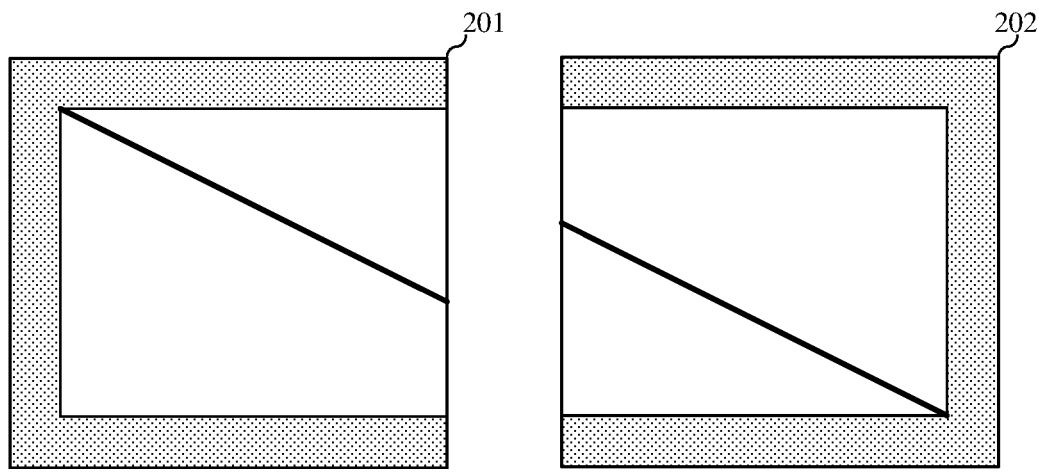

In step 1022, each photographing assembly photographs the chip plate on which the paper is placed, to acquire a simulated image. Referring to FIG. 4, a first simulated image 201 captured by the first photographing assembly is acquired, and a second simulated image 202 captured by the second photographing assembly is acquired. In combination with FIG. 3, the first simulated image 201 is the image on the left side of the dotted line B, and the second simulated image 202 is the image on the right side of the dotted line A. The paper having the image difference from the chip plate is placed on the chip plate, a clipping program for acquiring a paper image from the simulated image is set, and the clipping program is applied to the chip plate image to acquire the chip tray image, thereby ensuring the accuracy of the chip tray image acquired from the chip plate image.

In step 1023, the clipping program for acquiring the paper image from the simulated image is set based on the image difference between a position corresponding to the paper and a position corresponding to the chip plate in the simulated image.

Specifically, the step of setting the clipping program for acquiring the paper image from the simulated image includes the following steps.

Figure 5:
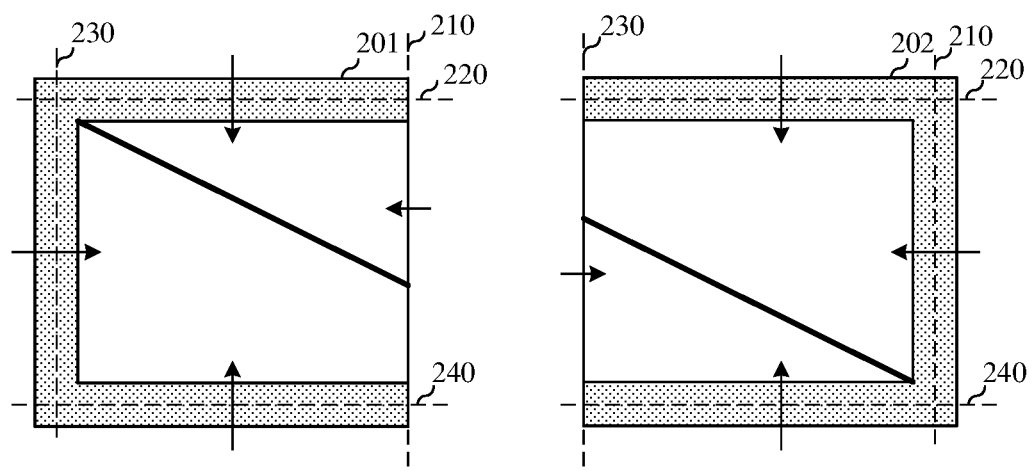

Referring to FIG. 5, in step 10231, a plurality of cropping edges respectively parallel to edges of the chip plate image are set, and each cropping edge is moved in parallel from a position close to an edge of the chip plate image to a position far from the edge of the chip plate image until the cropping edge is located at an edge of the paper image. By moving the cropping edges from the edges of the chip plate image to the edges of the paper image, the clipping program for acquiring the paper image from the simulated image is accurately set. Specifically, until the cropping edge is located at an edge of the paper image includes: until an image length at a position in the paper corresponding to a position of a cropping edge is greater than an image length at a position in the chip plate corresponding to a position of a cropping edge.

In a specific example, the chip plate image is placed in a rectangular coordinate system. For each cropping edge, a straight line equation for the cropping edge, and a change threshold corresponding to the cropping edge are set, and a function $f(x, y)$ is set. When an image length at a position in the paper corresponding to a position of a cropping edge is greater than an image length at a position in the chip plate corresponding to a position of a cropping edge, $f(x, y)=1$. When an image length at a position in the paper corresponding to a position of a cropping edge is not greater than an image length at a position in the chip plate corresponding to a position of a cropping edge, $f(x, y)=0$. When the change threshold is 0, the cropping edge is moved in parallel from a position close to an edge of the chip plate image to a position far from the edge of the chip plate image until an image length at a position in the paper corresponding to a position of a cropping edge is greater than an image length at a position in the chip plate corresponding to a position of a cropping edge, and then the change threshold is set to be 1.

Specifically, referring to FIG. 7, it is assumed that the chip plate image is an rectangular image having the length of n1 and the width of n2, and the chip image is located in the first quadrant of the rectangular coordinate system. A long edge of the chip plate image coincides with x axis, and a short edge coincides with y axis.

A counter k is set, and the counter k is initialized. A straight line equation of a straight line x1, i.e., x1=0, and a change threshold b1 corresponding to the straight line are set. The straight line x1 is the cropping edge on the side of the chip plate image close to y axis. If b1 is not equal to 1, it indicates that, at this time, the cropping edge is not moved to a cropping position, and whether $f(x1+k, y)$ is equal to 1 is determined. If $f(x1+k, y)$ is equal to 1, it indicates that, at this time, the cropping edge is moved to the cropping position, and b1 is set to be 1. If $f(x1+k, y)$ is not equal to 1, it indicates that the moved cropping edge is still not moved to the cropping position, k=k+1 is executed, that is, the value of the counter is added by 1. Then, whether b1 is equal to 1 is determined again until $f(x1+k, y)$ is equal to 1, and the straight line equation x1 of the cropping edge is acquired.

The counter k is initialized. A straight line equation of a straight line x2, i.e., x2=n1, and a change threshold b2 corresponding to the straight line are set. The straight line x2 is the cropping edge on the side of the chip plate image far from y axis. If b2 is not equal to 1, it indicates that, at this time, the cropping edge is not moved to a cropping position, and whether $f(x2-k, y)$ is equal to 1 is determined. If $f(x2-k, y)$ is equal to 1, it indicates that, at this time, the cropping edge is moved to the cropping position, and b2 is set to be 1. If $f(x2-k, y)$ is not equal to 1, it indicates that the moved cropping edge is still not moved to the cropping position, k=k+1 is executed, that is, the value of the counter is added by 1. Then, whether b2 is equal to 1 is determined again until $f(x2-k, y)$ is equal to 1, and the straight line equation x2 of the cropping edge is acquired.

The counter k is initialized. A straight line equation of a straight line y3, i.e., y3=0, and a change threshold b3 corresponding to the straight line are set. The straight line y3 is the cropping edge on the side of the chip plate image close to x axis. If b3 is not equal to 1, it indicates that, at this time, the cropping edge is not moved to a cropping position, and whether $f(x, y3+k)$ is equal to 1 is determined. If $f(x, y3+k)$ is equal to 1, it indicates that, at this time, the cropping edge is moved to the cropping position, and b3 is set to be 1. If $f(x, y3+k)$ is not equal to 1, it indicates that the moved cropping edge is still not moved to the cropping position, k=k+1 is executed, that is, the value of the counter is added by 1. Then, whether b3 is equal to 1 is determined again until $f(x, y3+k)$ is equal to 1, and the straight line equation y3 of the cropping edge is acquired.

The counter k is initialized. A straight line equation of a straight line y4, i.e., y4=n2, and a change threshold b4 corresponding to the straight line are set. The straight line y4 is the cropping edge on the side of the chip plate image far from x axis. If b4 is not equal to 1, it indicates that, at this time, the cropping edge is not moved to a cropping position, and whether $f(x, y4-k)$ is equal to 1 is determined. If $f(x, y4-k)$ is equal to 1, it indicates that, at this time, the cropping edge is moved to the cropping position, and b4 is set to be 1. If $f(x, y4-k)$ is not equal to 1, it indicates that the moved cropping edge is still not moved to the cropping position, k=k+1 is executed, that is, the value of the counter is added by 1. Then, whether b4 is equal to 1 is determined again until $f(x, y4-k)$ is equal to 1, and the straight line equation y4 of the cropping edge is acquired.

Figure 6:
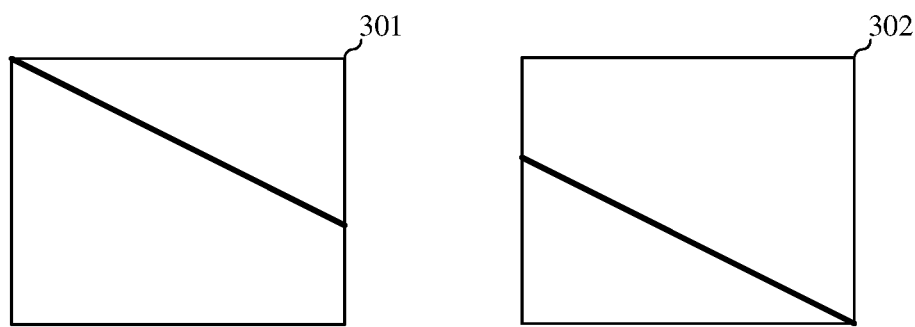

Referring to FIG. 5 and FIG. 6, in step 10232, the paper image is cropped based on an image bounded by the plurality of moved cropping edges.

In step 1024, the chip tray image is acquired from the chip plate image based on the clipping program. Specifically, the chip tray image is acquired from the chip plate image based on the clipping program for acquiring the paper image from the simulated image.

At block 103, a plurality of chip tray images are fitted to acquire the chip image.

Specifically, the plurality of chip tray images are fitted to acquire the chip image, where the chip image is an image of the entire chip tray.

Referring to FIG. 3 to FIG. 6, the position of a marking line is calibrated in the chip tray, and the marking line or an extension line of the marking line intersects with each edge of the chip tray or an extension line of each edge of the chip tray. The operation of fitting the plurality of chip tray images to acquire the chip image includes: removing overlaps between the plurality of chip tray images based on the relative positions between the positions of the marking lines in the chip tray images and the positions of the edges of the chip tray images, so as to acquire the chip image. The same position in different images is determined based on the relative positions between the positions of the marking lines in the chip tray images and the positions of the edges of the chip tray images, thereby ensuring the accuracy of removing the overlaps between the plurality of chip tray images.

In the embodiment, the marking line is a diagonal line of the chip tray. By taking the diagonal line as the marking line, it is ensured that the distances from any point on the diagonal line to an edge of the chip tray are different, thereby further ensuring the accuracy of removing the overlaps between the plurality of chip tray images.

In other embodiments, the marking line includes a plurality of sub-marking lines calibrated in the chip tray, and each sub-marking line or the extension line of the sub-marking line at least intersects with one of the edges of the chip tray. Through the marking line consisting of a plurality of sub-marking lines, the number of comparison objects for the relative position is increased, thereby further ensuring the accuracy of removing the overlaps between the plurality of chip tray images.

Specifically, the operation of fitting the plurality of chip tray images to acquire the chip image includes: sequentially fitting two adjacent chip tray images until fitting for the plurality of chip tray images is completed.

It should be noted that the operation of fitting the plurality of chip tray images may be performed two by two until the fitting for the plurality of chip tray images is completed, or may be performed three by three, four by four or the like until the fitting for the plurality of chip tray images is completed. In the embodiment, introduction is made by taking fitting in a two by two manner as an example. In specific application, the fitting mode for the chip tray images can be designed according to the actual number of the photographing assemblies.

Referring to FIG. 8, the operation of fitting two adjacent chip tray images includes: respectively taking two adjacent chip tray images as a first image 301 and a second image 302; and setting a first fitting straight line 310 in the first image 301, where an intersection between the first fitting straight line 310 and the marking line is a first intersection A1, and setting a second fitting straight line 320 in the second image 302, where an intersection between the second fitting straight line 320 and the marking line is a second intersection B1. The first fitting straight line 310 and the second fitting straight line 320 have the same extension direction. By setting the fitting straight lines in parallel in the first image and the second image, and moving the fitting straight lines towards a direction in which the distance is decreased, it is ensured that in the moving process, an edge in one chip tray image of which the relative position is the same as the relative position of an edge in another chip tray image can be acquired, thereby ensuring the integrity of removing the overlaps between the plurality of chip tray images.

Referring to FIG. 8 and FIG. 9, the first fitting straight line 310 and the second fitting straight line 320 when the position of the first intersection A1 is the same as the position of the second intersection B1 are acquired.

The embodiment provides two methods for acquiring a position at which the position of the first intersection A1 is the same as the position of the second intersection B1, which specifically includes:

the first method: sequentially moving the first fitting straight line 310 and the second fitting straight line 320 until a position at which the position of the first intersection A1 is the same as the position of the second intersection B1 is acquired. In the embodiment, a mode of alternately moving the first fitting straight line 310 and the second fitting straight line 320 is adopted; and in other embodiments, a mode of simultaneously moving the first fitting straight line and the second fitting straight line may be adopted; and the second method: acquiring the positions of all first intersections A1 after the first fitting straight line 310 is moved, acquiring the positions of all second intersections B1 after the second fitting straight line 320 is moved, and acquiring a position at which the position of the first intersection A1 is the same as the position of the second intersection B1.

Specifically, two adjacent chip tray images are placed in the rectangular coordinate system. A straight line equation for the first fitting straight line and a straight line equation for the second fitting straight line are set; and a function $g(x)$ is set. The user acquires the position of the first intersection or the second intersection. If the position of the first intersection is different from the position of the second intersection, the first fitting straight line and the second fitting straight line are sequentially moved until the position at which the position of the first intersection is the same as the position of the second intersection is acquired; and the first fitting straight line and the second fitting straight line at the same time are acquired.

It is assumed that the length of the first image is $n3$, and the length of the second image is $n4$.

In an example, referring to FIG. 11, a straight line equation $x3=n3/2$ of the first fitting straight line, and a straight line equation $x4=n4/2$ of the second fitting straight line are set. A moving counter $m1$ of the first fitting straight line $x3$ is set, and the counter $m1$ is initialized, that is, $m1$ is set to be 0; and a moving counter $m2$ of the second fitting straight line $x4$ is set, and the counter $m2$ is initialized, that is, $m2$ is set to be 0. Then, whether the position $g(x3)$ of the first intersection is equal to the position $g(x4)$ of the second intersection is determined, if yes, the first fitting straight line and the second fitting straight line are acquired, and if not, the value of the moving counter $m1$ of the first fitting straight line is added by 1, i.e., $m1=m1+1$. Whether the position $g(x3+m1)$ of the first intersection is equal to the position $g(x4-m2)$ of the second intersection is determined, if yes, the first fitting straight line and the second fitting straight line are acquired, and if not, the value of the moving counter $m2$ of the second fitting straight line is added by 1, i.e., $m2=m2+1$. Whether the position $g(x3+m1)$ of the first intersection is equal to the position $g(x4-m2)$ of the second intersection is determined, if yes, the first fitting straight line and the second fitting straight line are acquired, and if not, the value of the moving counter of the first fitting straight line is added by 1 again until the first fitting straight line $x3$ and the second fitting straight line $x4$ at a position where the position $g(x3+m1)$ of the first intersection is the same as the position $g(x4-m2)$ of the second intersection are acquired.

In another example, referring to FIG. 12, a straight line equation $x3=n3/2$ of the first fitting straight line, and a straight line equation $x4=n4/2$ of the second fitting straight line are set. A moving counter $m$ shared by the first fitting straight line $x3$ and the second fitting straight line $x4$ is set, and the counter $m$ is initialized, that is, $m$ is set to be 0. Then, whether the position $g(x3)$ of the first intersection is equal to the position $g(x4)$ of the second intersection is determined, if yes, the first fitting straight line and the second fitting straight line are acquired, and if not, the value of the moving counter $m$ is added by 1, i.e., $m1=m1+1$. Whether the position $g(x3+m1)$ of the first intersection is equal to the position $g(x4-m2)$ of the second intersection is determined, if yes, the first fitting straight line and the second fitting straight line are acquired, and if not, the value of the moving counter $m$ is added by 1 again until the first fitting straight line $x3$ and the second fitting straight line $x4$ at a position where the position $g(x3+m1)$ of the first intersection is the same as the position $g(x4-m2)$ of the second intersection are acquired.

It should be noted that when setting the straight line equations of the first fitting straight line and the second fitting straight line, the user can round up or down to ensure that $x3$ and $x4$ are integers, thereby avoiding a situation where the first fitting straight line and the second fitting straight line are misaligned due to movement, so that the position at which the position of the first intersection is the same as the position of the second intersection cannot be acquired.

Referring to FIG. 10, the overlap between the first chip tray image and the second chip tray image is removed to acquire the chip image.

Specifically, a fitted image of two adjacent chip tray images is acquired based on the first fitting straight line 310 and the second fitting straight line 320. The fitted image includes: a portion from the position of the first fitting straight line 310 to the position of the edge of the first image 301 far from the second image 302, and a portion from the position of the second fitting straight line 320 to the position of the edge of the second image 302 far from the first image 301.

Compared with the related art, a plurality of photographing assemblies are configured to photograph the chip tray, and different photographing assemblies are configured to photograph different areas of the chip tray. The plurality of photographing assemblies photograph the different areas of the chip tray at the same time, so that the image of the entire chip tray can be acquired in a single photographing process, thereby acquiring the codes of all chips in the chip tray, saving the detection time, and facilitating batch production of chips.

The division of various steps above is only for clear description, and during implementation, the steps may be combined into one step or some steps may be divided into multiple steps. As long as the steps include the same logical relationship, the divisions all fall within the scope of protection of the patent. Adding insignificant amendments or introducing insignificant designs to the process without changing the core design of the process falls within the scope of protection of the patent.

It can understand by persons of ordinary skill in the art that the foregoing embodiments are specific embodiments for implementing the disclosure, and in practical applications, various changes may be made in form and detail without departing from the spirit and scope of the disclosure.

The invention claimed is:

1. A method for fitting an image, comprising:
    providing a chip plate and a plurality of photographing assemblies, wherein the chip plate is used to place a chip tray, and the photographing assemblies are used to capture images of the chip plate;
    acquiring a chip plate image captured by each photographing assembly, wherein the chip plate image is an image of the chip plate with a partial area and the chip tray placed on the chip plate;
    acquiring a chip tray image comprised in each chip plate image, wherein the chip tray image is an image of the chip tray with a partial area; and
    fitting a plurality of chip tray images to acquire a chip image, wherein the chip image is an image of an entire chip tray.

2. The method of claim 1, comprising:
    capturing, by a first photographing assembly, a first chip plate image for a first area of the chip plate, and capturing, by a second photographing assembly, a second chip plate image for a second area of the chip plate, wherein a sum of the first chip plate image and the second chip plate image at least covers an image of an entire chip plate;
    acquiring the first chip plate image and the second chip plate image;
    acquiring a first chip tray image based on the first chip plate image, and acquiring a second chip tray image based on the second chip plate image, wherein a sum of the first chip tray image and the second chip tray image covers the image of the entire chip tray; and
    removing an overlap between the first chip tray image and the second chip tray image to acquire the chip image.

3. The method of claim 1, comprising: acquiring the chip tray image comprised in the chip plate image based on an image difference between a position corresponding to the chip tray and a position corresponding to the chip plate in the chip plate image.

4. The method of claim 3, wherein the image difference comprises at least one of a color difference, a gray scale difference, or a brightness difference.

5. The method of claim 3, comprising:
    placing paper on the chip plate, wherein the paper and the chip plate have the image difference;
    acquiring photograph of the chip plate on which the paper is placed, by each photographing assembly, to acquire a simulated image;
    setting a clipping program for acquiring a paper image from the simulated image based on the image difference between a position corresponding to the paper and a position corresponding to the chip plate in the simulated image; and
    acquiring the chip tray image from the chip plate image based on the clipping program.

6. The method of claim 5, wherein setting the clipping program for acquiring the paper image from the simulated image comprises:
    setting a plurality of cropping edges respectively parallel to edges of the chip plate image;
    moving each cropping edge in parallel from a position close to an edge of the chip plate image to a position far from the edge of the chip plate image until the cropping edge is located at an edge of the paper image; and
    cropping the paper image based on an image bounded by a plurality of moved cropping edges.

7. The method of claim 6, wherein until the cropping edge is located at the edge of the paper image comprises: until an image length at a position in the paper corresponding to a position of the cropping edge is greater than an image length at a position in the chip plate corresponding to the position of the cropping edge.

8. The method of claim 7, wherein until the image length at the position in the paper corresponding to the position of the cropping edge is greater than the image length at the position in the chip plate corresponding to the position of the cropping edge comprises:
    placing the chip plate image in a rectangular coordinate system;
    for each cropping edge, setting a straight line equation for the cropping edge, and a change threshold corresponding to the cropping edge; and setting a function $f(x, y)$, wherein when the image length at the position in the paper corresponding to the position of the cropping edge is greater than the image length at the position in the chip plate corresponding to the position of the cropping edge, $f(x, y)=1$, and when the image length at the position in the paper corresponding to the position of the cropping edge is not greater than the image length at the position in the chip plate corresponding to the position of the cropping edge, $f(x, y)=0$; and
    when the change threshold is 0, moving the cropping edge in parallel from the position close to the edge of the chip plate image to the position far from the edge of the chip plate image until the image length at the position in the paper corresponding to the position of the cropping edge is greater than the image length at the position in the chip plate corresponding to the position of the cropping edge, and setting the change threshold to be 1.

9. The method of claim 1, wherein a position of a marking line is calibrated in the chip tray, and the marking line or an extension line of the marking line intersects with each edge of the chip tray or an extension line of each edge of the chip tray; and fitting the plurality of chip tray images to acquire the chip image comprises:

removing overlaps between the plurality of chip tray images based on relative positions between positions of the marking lines in the chip tray images and positions of edges of the chip tray images, to acquire the chip image.

10. The method of claim 9, wherein the marking line is a diagonal line of the chip tray.

11. The method of claim 9, wherein the marking line comprises a plurality of sub-marking lines calibrated in the chip tray, and each sub-marking line or an extension line of the sub-marking line at least intersects with one of the edges of the chip tray.

12. The method of claim 1, wherein fitting the plurality of chip tray images to acquire the chip image comprises: sequentially fitting two adjacent chip tray images until fitting for the plurality of chip tray images is completed.

13. The method of claim 12, wherein fitting the two adjacent chip tray images comprises:

taking the two adjacent chip tray images as a first image and a second image respectively;

setting a first fitting straight line in the first image, and setting a second fitting straight line in the second image, wherein an intersection between the first fitting straight line and a marking line is a first intersection, an intersection between the second fitting straight line and the marking line is a second intersection, and the first fitting straight line and the second fitting straight line have a same extension direction;

acquiring the first fitting straight line and the second fitting straight line when a position of the first intersection is same as a position of the second intersection; and acquiring a fitted image of the two adjacent chip tray images based on the first fitting straight line and the second fitting straight line, wherein the fitted image comprises: a portion from a position of the first fitting straight line to a position of an edge of the first image far from an area of the second image, and a portion from a position of the second fitting straight line to a position of an edge of the second image far from an area of the first image.

14. The method of claim 13, wherein acquiring a position at which the position of the first intersection is the same as the position of the second intersection comprises:

sequentially moving the first fitting straight line and the second fitting straight line until the position at which the position of the first intersection is the same as the position of the second intersection is acquired; or acquiring positions of all first intersections after the first fitting straight line is moved, acquiring positions of all second intersections after the second fitting straight line is moved, and acquiring the position at which the position of the first intersection is the same as the position of the second intersection.

15. The method of claim 13, wherein acquiring the first fitting straight line and the second fitting straight line when the position of the first intersection is the same as the position of the second intersection comprises:

placing two adjacent chip tray images in a rectangular coordinate system;

setting a straight line equation for the first fitting straight line and a straight line equation for the second fitting straight line; and setting a function g(x), which is used for acquiring the position of the first or second intersection; and when the position of the first intersection is different from the position of the second intersection, sequentially moving the first fitting straight line and the second fitting straight line until a position at which the position of the first intersection is the same as the position of the second intersection is acquired, and acquiring the first fitting straight line and the second fitting straight line at same time.

\* \* \* \* \*